Aug. 3, 1965

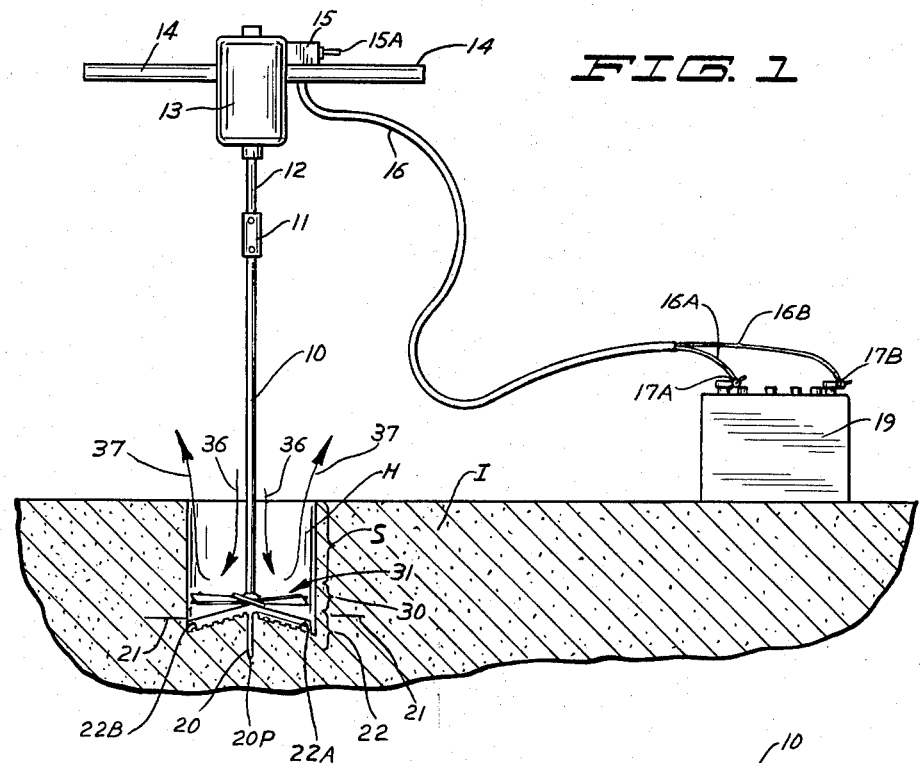
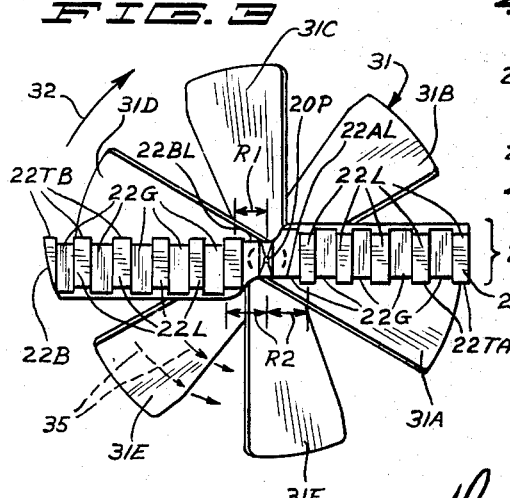

M. L. MISHLER 3,198,266

ICE FISHING DRILL

Filed July 2, 1963

INVENTOR.
MAX MISHLER
BY
Dugger Braddock Johnson & Westman
ATTORNEYS

Aug. 3, 1965 — M. L. MISHLER — 3,198,266
ICE FISHING DRILL
Filed July 2, 1963 — 3 Sheets-Sheet 3

INVENTOR.
MAX MISHLER
BY
Dugger Braddock Johnson + Westman
ATTORNEYS

United States Patent Office 3,198,266
Patented Aug. 3, 1965

3,198,266
ICE FISHING DRILL
Max L. Mishler, Mentor, Minn.
Filed July 2, 1963, Ser. No. 292,399
12 Claims. (Cl. 175—18)

This invention relates to a drill for ice and similar materials, and has particular usefulness in drilling holes for ice fishing on lakes, rivers, etc.

Since ice fishing has become a popular and widely attended sport, there have been developed a number of ice drills for drilling a "fishing hole" through the ice on lakes, rivers, etc. In the most northern of the United States, the ice layer may reach a thickness as much as 36 inches or more, and to make a "fishing hole" through such a layer of ice by hand methods is a laborious and time consuming project. The old way of doing it was by means of a pick or chisel, which is satisfactory enough, except that a great deal of work is involved and all too frequently there is not very much time left for sport. "Ice drills" are intended to provide a mechanical facility by means of which the hole can be produced expeditiously and with little effort.

The drilling of ice presents various problems, which are not easily solved. For a succesful ice drill, it is desirable that the amount of power required for the drill should not be excessive. The ice should be removed as chips, and provisions should be made for easily removing the accumulated chips, without the necessity for secondary operations such as scooping and bailing the hole, etc. Where a power source is used for operating the ice drill, the drill should be capable of use without hazard to the operator and should easily and perfectly drill into the ice, once the location is chosen. Equally important is the necessity that, when the drill penetrates through the under side of the ice, that no untoward operations of the rotating drill should occur, which might be hazardous to the operator.

It is an object of the present invention to provide an improved ice drill fulfilling all of the conditions aforesaid. It is a further object of the invention to provide an ice drill which is economical to manufacture and of simple construction. It is another object of the invention to provide an ice drill which conveniently and quickly penetrates the ice, bores down through the ice, has provision for removing the ice drillings or "chips," and which penetrates through the underside of the ice in a safe and convenient manner and which, upon withdrawal from the ice, cleans the hole from accumulated ice debris. It is another object of the invention to provide an ice drill which may be motor-powered from an ordinary automotive battery source or from a relatively low power source as may be available, and which will not require any large power consumption.

Other and further objects are those inherent in the invention herein illustrated, described and claimed and will be apparent as the description proceeds.

It is a further object of this invention to provide an ice drill which employs high speed chipping to cut ice from a hole as opposed to the low speed shaving in more common use.

A still further object of this invention is to provide an ice drill which will effectively remove ice from the hole being cut, and yet is of light construction.

To the accomplishment of the foregoing and related ends, this invention then comprises the features hereinafter fully described and particularly pointed out in the claims, the following description setting forth in detail certain illustrative embodiments of the invention, these being indicative however, of but a few of the various ways in which the principles of the invention may be employed.

The invention is illustrated with reference to the drawings wherein:

FIGURE 1, is a side elevational view of one embodiment of the invention showing it in use in drilling a hole in ice;

FIGURE 2, is a fragmentary side elevational view of the ice drill of FIGURE 1 only the drill portion being shown, the upper drive shaft and motor not shown. In FIGURE 2, the drill is shown removed from the ice;

FIGURE 3, is a bottom view of the drill of FIGURE 2, taken at the direction or arrows 3—3 of FIGURE 2;

In FIGURE 6, the drill is shown in full lines near the bottom of the ice layer and is shown in dotted lines at the point of penetrating the bottom of the ice layer;

Figure 7:
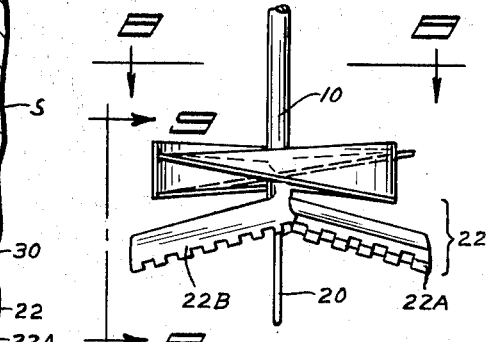
Figure 8:
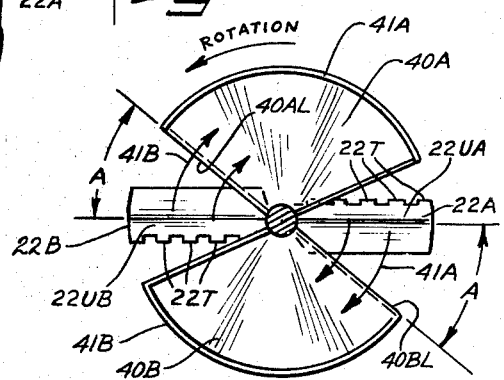
Figure 9:
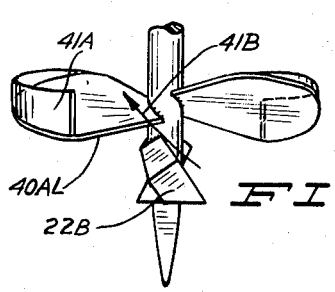
Figure 10:
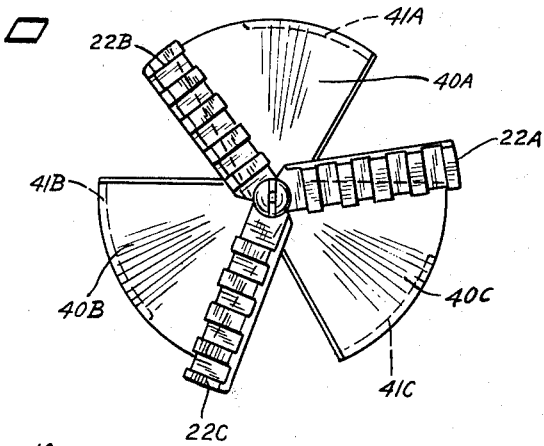

FIGURES 7, 8 and 9 illustrate another embodiment of the invention, FIGURE 7 being a fragmentary side elevational view of the ice drill portion of the device, FIGURE 8 being a sectional view looking downwardly, as in the direction of arrows 8—8 of FIGURE 7 and FIGURE 9 at a side elevational view similar to FIGURE 7, but taken at right angles thereto, as in the direction of arrows 9—9 of FIGURE 7;

FIGURE 10, illustrated another embodiment of ice drill of my invention, being somewhat similar to that shown in FIGURES 7, 8 and 9. FIGURE 10 is a bottom view of the ice drill of this embodiment.

Figure 11:
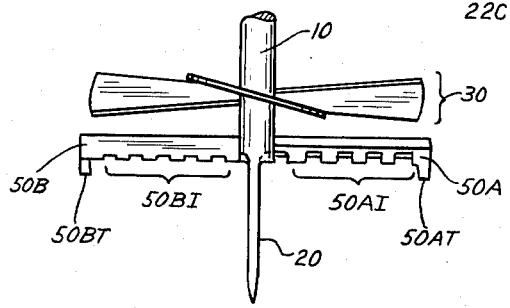
Figure 12:
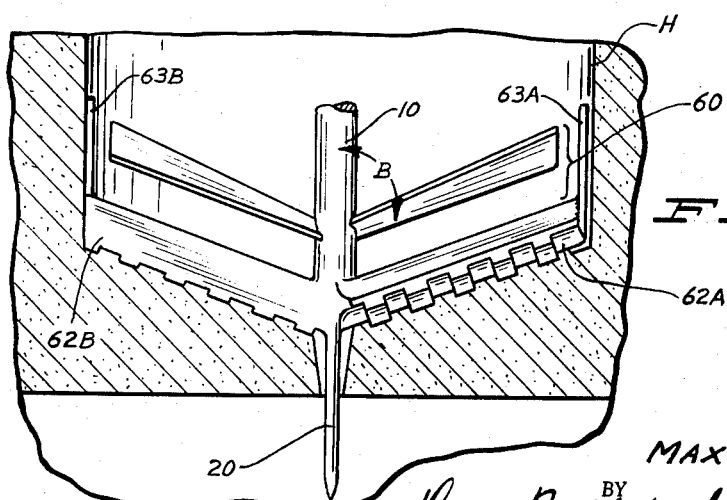

FIGURE 11 illustrates still another embodiment of ice drill embodying my invention, FIGURE 11 being a side elevational view; and FIGURE 12 is yet another embodiment of ice drill of my invention, FIGURE 12 being a side elevational view of the drill and a sectional view of the ice layer and shows the drill boring through a layer of ice with the leader of the drill just penetrating the under surface of the ice layer.

Throughout the drawings corresponding numerals refer to the same parts.

Referring to FIGURES 1–6 the invention includes a drive shaft 10 having a coupling 11 by means of which it is coupled to a power source. Here the power source includes the shaft 12 of an electric motor 13. For use in my invention any power source, electrical, gasoline engine, mechanical or hand power may be used. One simple form of power source is simply an electric starter motor of an automobile to which handles 14—14 are added so that it can be conveniently held. There is also provided a switch 15 through which the two wire electrical cable 16 is attached. The switch 15 has an "on" and "off" position and may be a spring biased switch which requires the switch operating handle 15A to be held to the "on" position in order to keep the motor 13 operating. The cable 16 is illustrated as having two wires 16A and 16B that may conveniently be provided with protecting our "alligator" clip 17A and 17B by means of which a quick connection can be made to the terminals of an automotive type battery 19, which may be separate or may be the battery in an automobile adjacent the place where the hole in the ice is to be drilled. Throughout the drawings, the ice layer is designated "I" and the hole drilled or to be drilled is designated "H."

Figure 4:
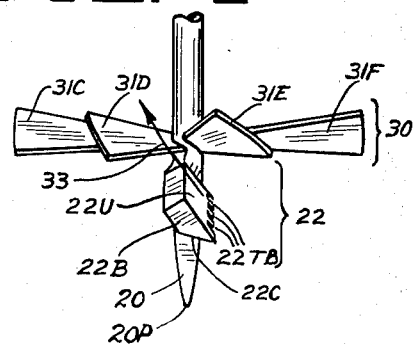
FIGURE 4 is another fragmentary side elevational view similar to FIGURE 2 but taken in the direction of arrows 4—4 of FIGURE 2 (i.e. at right angles to the viewing direction of FIGURE 2)
Figure 5:
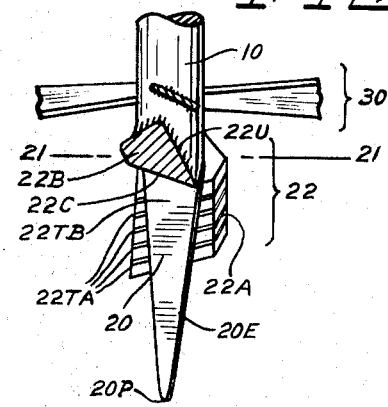
FIGURE 5 is a sectional view partly in elevation, and taken in the direction of arrows 5—5 of FIGURE 2.

At the lower end of the drive shaft 10, there is provided a leader 20 which has a tapered configuration best illustrated in FIGURE 5. The leader 20 tapers down to a lower terminal point 20P, and from this extends back cutting edges 20E—20E, which are ground so as to provide a "rake" (clearance behind the cutting edge). Leader 20 is preferably, though not necessarily, made integral with the shaft 10. Thus it can be made by milling the shaft so as to provide two flats, between which enough stock is left to form the leader. This is then taper-ground to the desired shape, as shown. According to another mode of construction, the shaft 10 may be slotted on the end to receive a leader of separate material which is then brazed or welded in place. The junction of the leader 20 in the shaft 10 occurs at approximately the line 21—21, and at this junction there is made the attachment of the cutting section of the drill which is shown opposite the bracket 22.

As will later be explained, the cutting section of the drill may take different forms. The type of cutting section for the embodiment of the drill illustrated in FIGURES 1–6, operates very satisfactorily and is preferred, although other types of cutting sections may be used. The cutting section 22 illustrated in this embodiment of the invention consists of two blades 22A and 22B which extend in positions generally radially opposite each other, and slant outwardly, i.e. toward the drilling direction. Accordingly, the outer ends of the two blades 22A and 22B are somewhat more advanced in the drilling direction then are their inner ends, adjacent the shaft 10. The blades are not quite of equal length, blade 22A being a little shorter than blade 22B. Each of these blades has a configuration as shown in the drawings. They have transverse grooves milled in their undersides as at 22G, thereby leaving lands 22L of metal between the grooves. The underside of the bars 22A and 22B are chamfered off at the surface 22C, see FIGURE 5, and the bars are positioned at an angle, and this accordingly leaves sharp cutting edges 22TA (for the cutting bar 22A) and 22TB (for the cutting bar 22B) as the front edges of the lands, and these are very much like sharp chisel edges. These edges cut the ice as the drill revolves.

By reference to FIGURES 2 and 3 it will be noted that the radial dimension R1 from the point 20P (which is the center line of the leader 20) to the center line of the first land 22L, is less, by the width of the land 22L, than the radial dimension R2 from the point 20P to the center line of the first land 22L for the bar 22A. (See FIGURE 3). Similarly, each of the lands 22L for the bar 22A are spaced outwardly than the corresponding land for the bar 22B, measured in each instance from the center 22P, to the centers of the lands. Accordingly, the lands 22L of the bar 22A (which terminate in the cutting teeth 22T of that bar) will cut grooves in the ice which track in the spaced left between the cuts made by the teeth 22T on the bar 22B. Stated another way, the cutting teeth of the bar 22A are staggered so as substantially to track in the spaces left between the cuts made by the teeth on the bar 22B.

It will also be noted that the outermost cutting tooth at the outer end of the bar 22B is of approximately one-half the width of other (normal) teeth, and also that the cutting bar 22B is made slightly longer than the bar 22A. The outer most tooth 22T on bar 22B accordingly cuts the full diameter of the hole, and the outer end surface of the bar 22B acts as a "skate" which runs around on the inner wall of the hole as it is drilled, around the center 20P, and helps to hold the drill centered. It has been found that there is a significant saving in power by thus having one cutter bar a little shorter and by having a "skate surface" on at least one of the bars. This avoids unnecessary drag on another cutting bar.

It will also be noted from FIGURES 2, 3 and 5 that where the bar 22A and 22B junction with the leader 20 and the shaft 10, that there is clearance left so that the leading edges 22AL and 22BL will actually act somewhat as cutting surfaces, and from this surface the groove, which is adjacent thereto slants backwardly thus providing relief. In this way ice removal is accomplished right up to the adjacent cutting edge of the leader 20, and progress with the drill in a drilling direction is not impeded by any undrilled portion of the ice closely adjacent the drill shaft.

Immediately above the drilling section 22 there is provided a chip transfer section 30, which in the embodiment of the invention shown in FIGURES 1–6, consists of a multi-bladed fan generally designated 31. The blades of this fan are numerous, but only two of the blades have major responsibility for action as chip-transfer blades. Thus referring to FIGURES 2, 3 and 4, the rotation of the drill is shown by the arrow 32. The teeth 22T on bar 22A accordingly are moving in a counterclockwise direction and cut chips of ice which are transferred upwardly along the upper surface 22U for bar 22B (not illustrated in FIGURES 2 and 3, but shown in FIGURE 4). A flow of chips accordingly proceeds in the direction of the arrow 33 and emerging from the bar 22A, will enter into the space between the fan blades 31A and 31B. This flow of chips is illustrated by the arrow 32 in FIGURE 2. Similarly, the chips cut by the teeth 22T of the bar 22B follow up on the upper surface 22U of that bar and are ejected into the space between the fan blades 31D and 31E, following a path as depicted by the arrows 35, FIGURES 3 and 4. Accordingly, it is the blades 31B and 31E which directly receive the chips that are cut by the bars 22A and 22B respectively, and transfer the chips to a position above the fan 21, as shown opposite the bracket S in FIGURES 1 and 6.

Figure 6:
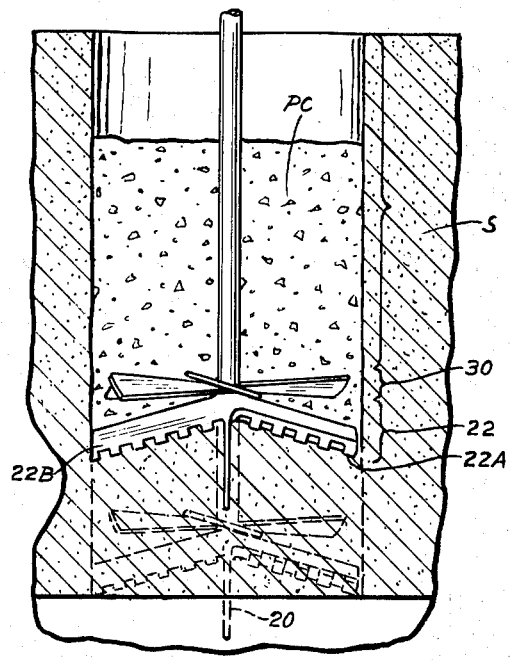
FIGURE 6 is an enlarged sectional view through the ice layer showing the ice drill of FIGURES 1–5 but at a position somewhat deeper in a thick layer of ice, than as illustrated in FIGURE 1.

What happens to the chips when they reach the position above the chip transfer device 30 depends upon the depth of the hole. In operation, the leader 20 is spiked into the ice a little way and the switch 15A is closed. The leader 20 quickly drills into the ice, then the outermost teeth 22T on each of the bars 22A and 22B quickly begin cutting circular grooves and penetrate down into the ice to a position as shown, for example in FIGURE 1. During this first portion of the drilling a circulation of air, depicted by the arrows 36 in FIGURE 1 will enter downwardly through the hole and closely adjacent the drive shaft 10 and gathering the chips of ice which are raised up by the chip-transfer means 30, the air and entrained chips will move upwardly via the arrows 37, and a hole fairly well cleaned of chips will result. However, as the drill penetrates deeper and deeper into the ice, as for example, when the hole is 12 to 15 inches in depth, the circulation of air as shown in FIGURE 1 will gradually become insufficient to move all of the ice chips out of the hole, and there begins to be accumulated a "Plug" of ice chips PC as shown in FIGURE 6. These plugs PC are composed of particles and shavings of ice, and especially when the drill has penetrated into the ice more than 12 to 15 inches but has not yet gone through deep enough to permit water to enter up through the hole, and the chips and shavings are transferred from the drilling section 22 by means of the chip-transfer section 30 to a position above the chip-transfer section thereby forming a plug PC, which is continuously increased in vertical dimension by the upward transfer of additional chips and shavings as the drill penetrates farther and farther into the ice. This plug does not fall down because it is supported by the blading of the ice transfer section 30, and due to the fact that more chips and shavings are being transferred upwardly by the blades 22A and 22E. Therefore, the undersurface of the plug PC is continuously supported by the multi-bladed fan 31 due to the action of all of the blades. The drill keeps on penetrating and the plug PC keeps building in vertical dimension, becoming meanwhile more compact. There is no necessity to withdraw the drill during drilling merely to lift the plug of ice chips out of the hole. It has been found by experience that the drill may be permitted to continue to penetrate into the ice until it cuts through the undersurface of the ice as shown in FIGURE 6. When this occurs, the leader 20 will, of course, first penetrate through the undersurface of the ice, and then as the outermost tooth 22T, which is the outer tooth on the bar 22B as shown in FIGURE 3, cuts the outer diameter of the hole, this tooth will normally score through the undersurface of the ice, if that undersurface is even, and complete the hole through the ice. There will always be a chunk of lens of ice below the drill, but this is usually cracked or broken to some extent by the drill action and any portions of this lense of ice which are sufficiently small are transferred up by the chip-transfer section 31. Of course, at this time, the water from the lake will rise through the hole and soak through the plug PC upwardly all the way to the top of the hole. If the drill were to be stopped and left unattended at this stage, and particularly in cold weather such as 30° below zero Fahrenheit or some such temperatures, there would quickly be a re-freezing of the ice and water in the hole, with the drill in place. However, the operator will, immediately upon drilling through the underside of the ice, stop rotation of the drill and withdraw the entire drill rig up from the hole, and in so doing the plug PC of ice chips, which at this time is saturated with water and is in a slushy condition, will be lifted and as the upper portions of the plug reach in position above the upper level of the ice, they will break off and can easily be pushed away from the hole, thereby leaving a clean hole, quite free from ice chips. If desired, the operator may then re-enter the drill into the ice hole which is already drilled, and this will cause any chips of ice which tend to float upwardly, to be transferred upwardly above the transfer section 30, and by withdrawing the drill again, it is easily possible to obtain a quite chip-free condition of the water in the hole.

In FIGURES 6, 7 and 8 there is illustrated another embodiment of my invention wherein the leader 20, the drill blades 22A and 22B are precisely the same as described with reference to the embodiment of the drill shown in FIGURES 1–6. However, the chip-transfer section 30 is slightly changed, consisting of two spirally configured fan blades 40A and 40B fastened to the drive shaft 10. Each of these blades is a segment of a spiral and the blades are oriented so that their downward (leading) edges, which are the edges 40AL and 40BI will be angularly disposed (by an angle such as the angle A), slightly behind the upwardly slanting surfaces 22UA and 22UB of the cutting blades 22A and 22B respectively. Accordingly, the chips cut by and flowing upwardly from the teeth of the blades 22A and 22B will move as shown by the arrows 41A and 41B up on to the upper surfaces of the spiral segments 40A and 40B respectively. At the outer peripheries of these spiral segments, there are provided upwardly extending flange surfaces or "shoes" 41A and 41B, which act as "skate" surfaces running on the inner surface of the hole which is produced by the blades 22A and 22B, thereby stabilizing and centrally locating the drill in the hole, even during the time of penetrating of the drill through the undersurface of the ice. Such being the case, blades 22A and 22B can be made of the same, or nearly the same length.

In FIGURE 10, is illustrated another embodiment of the invention similar to that shown in FIGURES 7, 8 and 9 except that instead of having two drilling blades 22A and 22B, and two spiral segments 40A and 40B, there are in the embodiment shown in FIGURE 10, three ice cutting blades 22A and 22B and 22C and three ice transferring spiral blades 40A, 40B and 40C. Each of the spiral blades has on it a skate surface as at 41A, 41B and 41C. The operation is as described with reference to the embodiment shown in FIGURES 7–9.

In FIGURE 11 there is illustrated another embodiment of the invention having on the shaft 10 a chip-transfer section 30 and a leader 20 which are the same as those described with reference to the embodiment shown in FIGURES 1–6. However, in FIGURE 11 the cutting or drill section is composed of radial blades 50A and 50B, which extend outwardly in a horizontal plane, rather than slanting in the drilling direction as in FIGURES 1–10. These cutter blades 50A and 50B are similar to those shown in FIGURES 1–6 except that the outermost teeth 50AT–50BT are made a little longer than the intermediate teeth shown over the brackets 50AI and 50BI. These teeth 50AT and 50BT serve to cut the diameter of the hole, and will also cut through the underside of the ice before the intermediate teeth 50AI and 50BI cut through. With the embodiments shown in FIGURE 11, it is more necessary to rely upon the leader 20 for centering the drill, since the arrangement of the cutter bars 50A and 50B in a horizontal plane makes starting of the drill a little more difficult, although once the drill is started, it will drill properly.

In FIGURE 12 there is illustrated another embodiment of the invention wherein the chip-transfer section 60 is a multi-blade fan similar to that shown at 30 in FIGURES 1–6 except that instead of having the fan blades extend at right angles to the drive shaft 10, in FIGURE 12 the fan blades are set at an angle $\beta$ with reference to the axis, and they thus revolve in a conical surface of revolution. Similarly, the cutting bars 62A and 62B are likewise set at the same angle $\beta$ with reference to the axis of the drive shaft 10, and these also will revolve in a conical surface of revolution. It will be noted that the bar 62B is slightly longer than the bar 62A, and it accordingly determines the size of the hole. At the outer end of each of the bars 62A and 62B there is provided a skate surface 63A and 63B, the surface 63B normally riding on the inside of the hole although the surface 63A may also sometimes slide against the inner surface of the hole in the event the leader 20 begins to cut through on the underside of the ice and wobbles a little. It is at such times that the skate surface 63A, which normally clears the inside surface of the hole, will sometimes skate against the inner surface of the hole and help keep the drill true.

According to this invention the chips are cut by a drill section and closely adjacent the drill there is provided a chip-transfer device which is of a size such that it can enter the hole, and by means of which the cut chips are transferred upwardly, so that they will be supported by such transfer means as a loose plug of chips, thereby enabling very deep penetration of a hole without withdrawing the drill for cleaning the hole.

As many widely apparently different embodiments of this invention may be made without departing from the spirit and scope thereof, it is to be understood that I do not limit myself to the specific embodiments herein.

What is claimed is:

1. An ice auger comprising a drive shaft, ice drill means on said shaft comprising a plurality of radially outwardly extending bars, each bar being toothed on the edge which is in the direction of rotation of said bars, ice transfer means mounted on the drive shaft, said ice-transfer means comprising a plurality of radially extending fan blades spaced so that a space is provided between each fan blade and between each cutting bar and the adjacent fan blade, said blades collectively acting as a support to hold the plug of ice chips collected in the hole around the drive shaft above the ice-chips transfer means but away from ice drill means as the drill enters deeply into ice.

2. The ice auger of claim 1 further characterized in that the bars of the ice drill means slant in the cutting direction.

3. The ice auger of claim 1 further characterized in that the ice-transfer means has more than two blades.

4. The ice auger of claim 1 further characterized in that the bars of the ice-drill means are slanted at an angle to the axis of the drive shaft so that their outer ends are away from the drilling direction.

5. The ice auger of claim 1 further characterized in that at least one bar of the ice-drill means has an outer end surface which skates on the inner surface of the drill hole made by the auger.

6. An ice drill comprising a drive shaft, rotary ice chipping means, ice transfer means, and power means, said ice chipping means comprising a plurality of radially extending bars attached to one end of said drive shaft, said power means disposed so as to rotate said drive shaft, and said ice transfer means comprising a plurality of fan blades extending radially from said drive shaft, and spaced a short distance from said ice chipping means, whereby said ice transfer means is operable to blow ice chips out of a hole.

7. The ice drill of claim 6 further characterized in that said radially extending bars are slanted at a small angle away from the leading end of said drive shaft.

8. The ice drill of claim 6 further characterized in that said radially extending bars are slanted at a small angle toward the leading end of said drive shaft.

9. The ice auger of claim 6 further characterized in that at least one bar of the ice chipper means has an outer end surface which skates on the inner surfaces of the drill hole made by the auger.

10. An ice auger comprising a drive shaft, ice drill means on the shaft for cutting the ice into chips so as thereby to drill a hole into ice as the shaft is turned, and ice-chip transfer means mounted on the shaft closely adjacent but spaced from the ice drill means and so as to turn with the shaft, said transfer means being of a size such that it can enter into the hole formed by the ice drill means, said auger being further characterized in that the ice drill means comprises a plurality of radially extending bars each having spaced teeth along that edge of the bar which is in the leading direction, the upper surface of each bar extending away from the drilling direction in a direction opposite the direction of rotation for cutting.

11. An ice auger comprising a drive shaft, ice drill means on the shaft for cutting the ice into chips so as thereby to drill a hole into ice as the shaft is turned, and ice-chip transfer means mounted on the shaft closely adjacent but spaced from the ice drill means and so as to turn with the shaft, said transfer means being of a size such that it can enter into the hole formed by the ice drill means, said auger being further characterized in that the ice drill means is composed of radially extending bars slanted so that they all rotate in a conical surface of rotation with the outer ends of the bar advanced further in a drilling direction than the inner ends of the bars.

12. An ice auger comprising a drive shaft, ice drill means on the shaft for cutting the ice into chips so as thereby to drill a hole into ice as the shaft is turned, and ice-chip transfer means mounted on the shaft closely adjacent but spaced from the ice drill means and so as to turn with the shaft, said transfer means being of a size such that it can enter into the hole formed by the ice drill means, said auger being further characterized in that the ice drill means comprises a plurality of radially extending bars each having spaced teeth along that edge of the bar which is in the leading direction, the upper surface of each bar extending away from the drilling direction in a direction opposite the direction of rotation for cutting, and further characterized in that one of the radially extending bars is longer than the other and cuts the full diameter of the hole.

References Cited by the Examiner

UNITED STATES PATENTS

| | | | |
|---|---|---|---|
| 120,076 | 10/71 | King | 175—385 |
| 154,679 | 9/74 | Jones | 175—385 |
| 322,365 | 7/85 | Fosburgh | 175—388 |
| 357,544 | 2/87 | Albright | 175—385 |
| 573,388 | 12/96 | Brownlee | 175—385 |
| 957,128 | 5/10 | Vesey | 175—385 |
| 2,680,597 | 6/54 | Brown | 175—385 |
| 2,709,572 | 5/55 | Ageborn | 175—18 |
| 2,733,047 | 1/56 | Morgan | 175—18 |
| 2,854,218 | 9/58 | Hedrick et al. | 175—18 |
| 2,860,855 | 11/58 | Vincent | 175—18 |
| 2,997,118 | 8/61 | Gulick | 175—18 |
| 3,131,777 | 5/64 | Snider | 175—18 |

FOREIGN PATENTS

| | | |
|---|---|---|
| 216,928 | 8/58 | Australia. |
| 499,809 | 2/54 | Canada. |
| 644,314 | 7/62 | Canada. |
| 463,168 | 4/51 | Italy. |

CHARLES E. O'CONNELL, *Primary Examiner.*